(12) United States Patent
Guo et al.

(10) Patent No.: US 10,120,236 B2
(45) Date of Patent: Nov. 6, 2018

(54) LIQUID CRYSTAL DISPLAY DRIVING CIRCUIT AND LIQUID CRYSTAL DISPLAY DEVICE

(71) Applicant: Wuhan China Star Optoelectronics Technology Co., Ltd., Wuhan, Hubei (CN)

(72) Inventors: Xingling Guo, Guangdong (CN); Xiang Yang, Guangdong (CN); Jiehui Qin, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 185 days.

(21) Appl. No.: 15/118,880

(22) PCT Filed: Jun. 29, 2016

(86) PCT No.: PCT/CN2016/087667
§ 371 (c)(1),
(2) Date: Aug. 13, 2016

(87) PCT Pub. No.: WO2017/215035
PCT Pub. Date: Dec. 21, 2017

(65) Prior Publication Data
US 2018/0173060 A1    Jun. 21, 2018

(30) Foreign Application Priority Data
Jun. 17, 2016 (CN) .......................... 2016 1 0431967

(51) Int. Cl.
*G09G 3/36* (2006.01)
*G02F 1/1335* (2006.01)
*G09G 3/34* (2006.01)

(52) U.S. Cl.
CPC ......... *G02F 1/133611* (2013.01); *G09G 3/36* (2013.01); *G09G 3/3607* (2013.01);
(Continued)

(58) Field of Classification Search
CPC ............ G02F 1/133611; G09G 3/3406; G09G 3/3607; G09G 2310/0264;
(Continued)

(56) References Cited

U.S. PATENT DOCUMENTS 6,448,953 B1 * 9/2002 Murade ................ G09G 3/3688
345/100
6,600,470 B1 * 7/2003 Tsuda ...................... G09G 3/36
345/102
(Continued)

FOREIGN PATENT DOCUMENTS

| CN | 101295472 A | 10/2008 |
|----|-------------|---------|
| CN | 101345038 A | 1/2009 |

(Continued)

*Primary Examiner* — Michael J Eurice
(74) *Attorney, Agent, or Firm* — Andrew C. Cheng

(57) ABSTRACT

The disclosure provides a liquid crystal display driving circuit and a liquid crystal display device. The liquid crystal display driving circuit includes a content adaptive brightness control circuit and a Gamma voltage adjustment circuit, when the content adaptive brightness control circuit is turned on, the brightness of the backlight module is switched from first backlight brightness to second backlight brightness under the control of the content adaptive brightness control circuit, when the brightness of the backlight module is the first backlight brightness, the Gamma voltage adjustment circuit outputs a first Gamma voltage for adjusting grayscale brightness of the liquid crystal display to be first grayscale brightness, when the brightness of the backlight module is the second backlight brightness, the Gamma voltage adjustment circuit outputs a second Gamma voltage (Continued)

for adjusting the grayscale brightness of the liquid crystal display to be second grayscale brightness.

8 Claims, 3 Drawing Sheets

(52) U.S. Cl.
CPC ... *G09G 3/3406* (2013.01); *G09G 2310/0264* (2013.01); *G09G 2320/0276* (2013.01); *G09G 2320/0646* (2013.01); *G09G 2320/0673* (2013.01); *G09G 2330/021* (2013.01); *G09G 2360/16* (2013.01)

(58) Field of Classification Search
CPC ... G09G 2320/0276; G09G 2320/0646; G09G 2320/0673; G09G 2330/021; G09G 2360/16
See application file for complete search history.

(56) References Cited

U.S. PATENT DOCUMENTS

| | | | |
|---|---|---|---|
| 2002/0093475 A1* | 7/2002 | Hashimoto | G09G 3/3611 345/87 |
| 2003/0156128 A1* | 8/2003 | Ito | G09G 3/3648 345/690 |
| 2004/0113906 A1 | 6/2004 | Lew et al. | |
| 2005/0207249 A1* | 9/2005 | Morita | G09G 3/3233 365/203 |
| 2006/0227082 A1* | 10/2006 | Ogata | G09G 3/3291 345/76 |
| 2008/0273002 A1* | 11/2008 | Kim | G02F 1/13452 345/98 |
| 2011/0025592 A1* | 2/2011 | Botzas | G09G 3/3406 345/102 |
| 2012/0287148 A1 | 11/2012 | Brown Elliott | |
| 2013/0082607 A1* | 4/2013 | Gandhi | G09G 3/3413 315/153 |
| 2013/0147699 A1 | 6/2013 | Seo | |

FOREIGN PATENT DOCUMENTS

| | | |
|---|---|---|
| CN | 101393727 A | 3/2009 |
| CN | 101599258 A | 12/2009 |
| CN | 201654370 U | 11/2010 |
| CN | 102456309 A | 5/2012 |
| CN | 103187032 A | 7/2013 |
| CN | 103928006 A | 7/2014 |
| CN | 105118455 A | 12/2015 |
| CN | 105869581 A | 8/2016 |

* cited by examiner

LIQUID CRYSTAL DISPLAY DRIVING CIRCUIT AND LIQUID CRYSTAL DISPLAY DEVICE

CROSS REFERENCE

This disclosure claims priority to Chinese patent application No. 201610431967.4, entitled "LIQUID CRYSTAL DISPLAY DRIVING CIRCUIT AND LIQUID CRYSTAL DISPLAY DEVICE" filed on Jun. 17, 2016, which is incorporated by reference in its entirety.

FIELD OF THE DISCLOSURE

The disclosure relates to a display technical field, and more particularly to a liquid crystal display driving circuit and a liquid crystal display device.

BACKGROUND OF THE DISCLOSURE

The trend of a liquid crystal display device such as a mobile phone, a personal digital assistant (PDA), a laptop and a tablet is going thinner and lighter, portable and multifunctional with the development of electronics industry. Energy consumption of a display of the liquid crystal display device is around 60%-70% of the entire consumption of the liquid crystal display device. In the display, energy consumption of a backlight module is 70%-80% of that of the display. However, a size and capacity of a battery in the liquid crystal display device is restricted by the volume of the liquid crystal display device. Therefore, energy provided to the backlight module is generally sacrificed for extending endurance of the liquid crystal display device when a battery is finite in size and capacity. However, brightness of the liquid crystal display will be reduced due to the sacrifice of energy consumption of the backlight module, so that poor effects will be provided in display.

SUMMARY OF THE DISCLOSURE

The disclosure provides a liquid crystal display driving circuit, the liquid crystal display driving circuit includes a content adaptive brightness control circuit and a Gamma voltage adjustment circuit, the content adaptive brightness control circuit is applied to adjust brightness of a backlight module in a liquid crystal display, when the content adaptive brightness control circuit is turned on, the brightness of the backlight module is switched from first backlight brightness to second backlight brightness under the control of the content adaptive brightness control circuit, where the first backlight brightness is brighter than the second backlight brightness, when the brightness of the backlight module is the first backlight brightness, the Gamma voltage adjustment circuit outputs a first Gamma voltage for adjusting grayscale brightness of the liquid crystal display to be first grayscale brightness, when the brightness of the backlight module is the second backlight brightness, the Gamma voltage adjustment circuit outputs a second Gamma voltage for adjusting the grayscale brightness of the liquid crystal display to be second grayscale brightness, where the second grayscale brightness is brighter than the first grayscale brightness, and brightness of an output image from the liquid crystal display when the grayscale brightness of the liquid crystal display is the second grayscale brightness and the brightness of the backlight module is the second backlight brightness is equal to brightness of an output image from the liquid crystal display when the grayscale brightness of the liquid crystal display is the first grayscale brightness and the brightness of the backlight module is the first backlight brightness.

The Gamma voltage adjustment circuit includes a Gamma curve feedback circuit, a control circuit, a storage circuit and a Gamma voltage output circuit, the Gamma curve feedback circuit is applied to detect the grayscale brightness of the liquid crystal display to be the second grayscale brightness when the brightness of the backlight module is switched from the first backlight brightness to the second backlight brightness, and transport the second grayscale brightness to the control circuit, the control circuit obtains the second Gamma voltage corresponding to the second grayscale brightness from the storage circuit according to the second grayscale brightness, and exports the second Gamma voltage by the Gamma voltage output circuit.

The Gamma voltage adjustment circuit further includes a line buffer and a D/A converter, the line buffer is applied to receive a RGB subpixel serial grayscale signal, and transform the RGB subpixel serial grayscale signal to a RGB subpixel parallel grayscale signal, where the RGB subpixel serial grayscale signal is a serial signal, the RGB subpixel parallel grayscale signal is a parallel signal, the D/A converter is applied to convert an analog Gamma voltage generated by the Gamma voltage output circuit to a digital Gamma voltage according to the RGB subpixel parallel grayscale signal, and export the digital Gamma signal to a corresponding pixel electrode in the liquid crystal display.

The Gamma voltage adjustment circuit further includes a level shifter, the level shifter is applied to receive the RGB subpixel parallel grayscale signal, and export the RGB subpixel parallel grayscale signal after its voltage being boosted to the D/A converter.

When the content adaptive brightness control circuit is turned off, the brightness of the backlight module in the liquid crystal display is constant, when the content adaptive brightness control circuit is turned off, the Gamma voltage adjustment circuit will not be operational.

The disclosure further provides a liquid crystal display device, the liquid crystal display device includes a liquid crystal display and a liquid crystal display driving circuit, the liquid crystal display driving circuit includes a content adaptive brightness control circuit and a Gamma voltage adjustment circuit, the content adaptive brightness control circuit is applied to adjust brightness of a backlight module in a liquid crystal display, when the content adaptive brightness control circuit is turned on, the brightness of the backlight module is switched from first backlight brightness to second backlight brightness under the control of the content adaptive brightness control circuit, where the first backlight brightness is brighter than the second backlight brightness, when the brightness of the backlight module is the first backlight brightness, the Gamma voltage adjustment circuit outputs a first Gamma voltage for adjusting grayscale brightness of the liquid crystal display to be first grayscale brightness, when the brightness of the backlight module is the second backlight brightness, the Gamma voltage adjustment circuit outputs a second Gamma voltage for adjusting the grayscale brightness of the liquid crystal display to be second grayscale brightness, where the second grayscale brightness is brighter than the first grayscale brightness, and brightness of an output image from the liquid crystal display when the grayscale brightness of the liquid crystal display is the second grayscale brightness and the brightness of the backlight module is the second backlight brightness is equal to brightness of an output image from the liquid crystal display when the grayscale brightness of the liquid crystal display is the first grayscale brightness and the brightness of the backlight module is the first backlight brightness.

The Gamma voltage adjustment circuit includes a Gamma curve feedback circuit, a control circuit, a storage circuit and a Gamma voltage output circuit, the Gamma curve feedback circuit is applied to detect the grayscale brightness of the liquid crystal display to be the second grayscale brightness when the brightness of the backlight module is switched from the first backlight brightness to the second backlight brightness, and transport the second grayscale brightness to the control circuit, the control circuit obtains the second Gamma voltage corresponding to the second grayscale brightness from the storage circuit according to the second grayscale brightness, and exports the second Gamma voltage by the Gamma voltage output circuit.

The Gamma voltage adjustment circuit further includes a line buffer and a D/A converter, the line buffer is applied to receive a RGB subpixel serial grayscale signal, and transform the RGB subpixel serial grayscale signal to a RGB subpixel parallel grayscale signal, where the RGB subpixel serial grayscale signal is a serial signal, the RGB subpixel parallel grayscale signal is a parallel signal, the D/A converter is applied to convert an analog Gamma voltage generated by the Gamma voltage output circuit to a digital Gamma voltage according to the RGB subpixel parallel grayscale signal, and export the digital Gamma signal to a corresponding pixel electrode in the liquid crystal display.

The Gamma voltage adjustment circuit further includes a level shifter, the level shifter is applied to receive the RGB subpixel parallel grayscale signal, and export the RGB subpixel parallel grayscale signal after its voltage being boosted to the D/A converter.

When the content adaptive brightness control circuit is turned off, the brightness of the backlight module in the liquid crystal display is constant, when the content adaptive brightness control circuit is turned off, the Gamma voltage adjustment circuit will not be operational.

Compared with a conventional technique, when the content adaptive brightness control circuit in the liquid crystal display driving circuit of the disclosure is turned on, the brightness of the backlight module is reduced from first backlight brightness to second backlight brightness. The Gamma voltage adjustment circuit is adjusting the exported Gamma voltage, when the brightness of the backlight module is the first backlight brightness, the Gamma voltage adjustment circuit outputs a first Gamma voltage for adjusting grayscale brightness of the liquid crystal display to be first grayscale brightness. When the brightness of the backlight module is the second backlight brightness, the Gamma voltage adjustment circuit outputs a second Gamma voltage for adjusting the brightness of the liquid crystal display to be second grayscale brightness. The second grayscale brightness is brighter than the first grayscale brightness, and brightness of an output image from the liquid crystal display when the grayscale brightness of the liquid crystal display is the second grayscale brightness and the brightness of the backlight module is the second backlight brightness is equal to brightness of an output image from the liquid crystal display when the grayscale brightness of the liquid crystal display is the first grayscale brightness and the brightness of the backlight module is the first backlight brightness. The brightness of the exported image from the liquid crystal display device is constant when energy consumption of the backlight module is reduced, display performance of the image is excellent.

BRIEF DESCRIPTION OF THE DRAWINGS

In order to more clearly illustrate the disclosure, following figures described in embodiments will be briefly introduced, it is obvious that the drawings are merely some embodiments of the disclosure, a person skilled in the art can obtain other figures according to these figures without creativity.

DETAILED DESCRIPTION OF PREFERRED EMBODIMENTS

Embodiments of the disclosure are described in detail with reference to the accompanying drawings as follows, obviously, the described embodiments are part of embodiments of the disclosure rather than all of them. Based on the embodiments of the disclosure, all other embodiments obtained by a person skilled in the art without creativity should be considered within the scope of protection of the disclosure.

Figure 1:
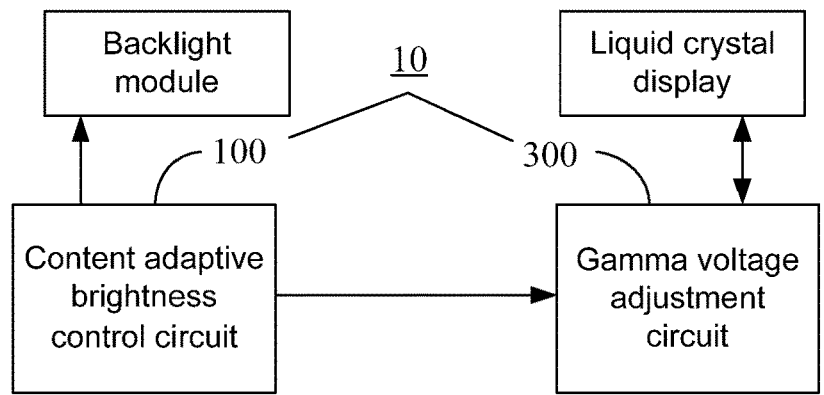
FIG. 1 is a circuit framework diagram of a liquid crystal display driving circuit of a preferred embodiment of the disclosure.
Figure 2:
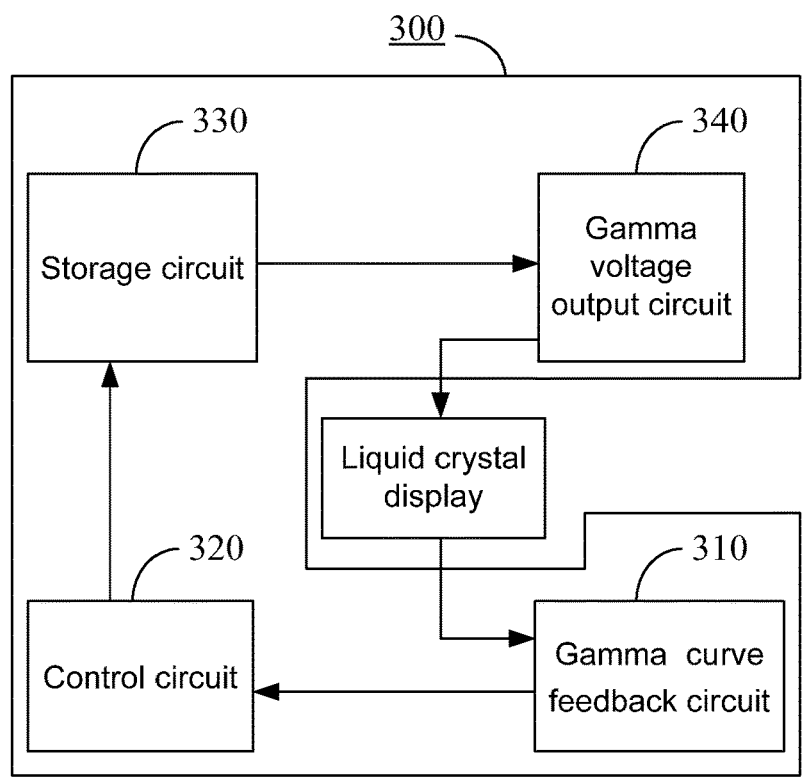
FIG. 2 is a circuit framework diagram of a Gamma voltage adjustment circuit of a preferred embodiment of the disclosure.
Figure 3:
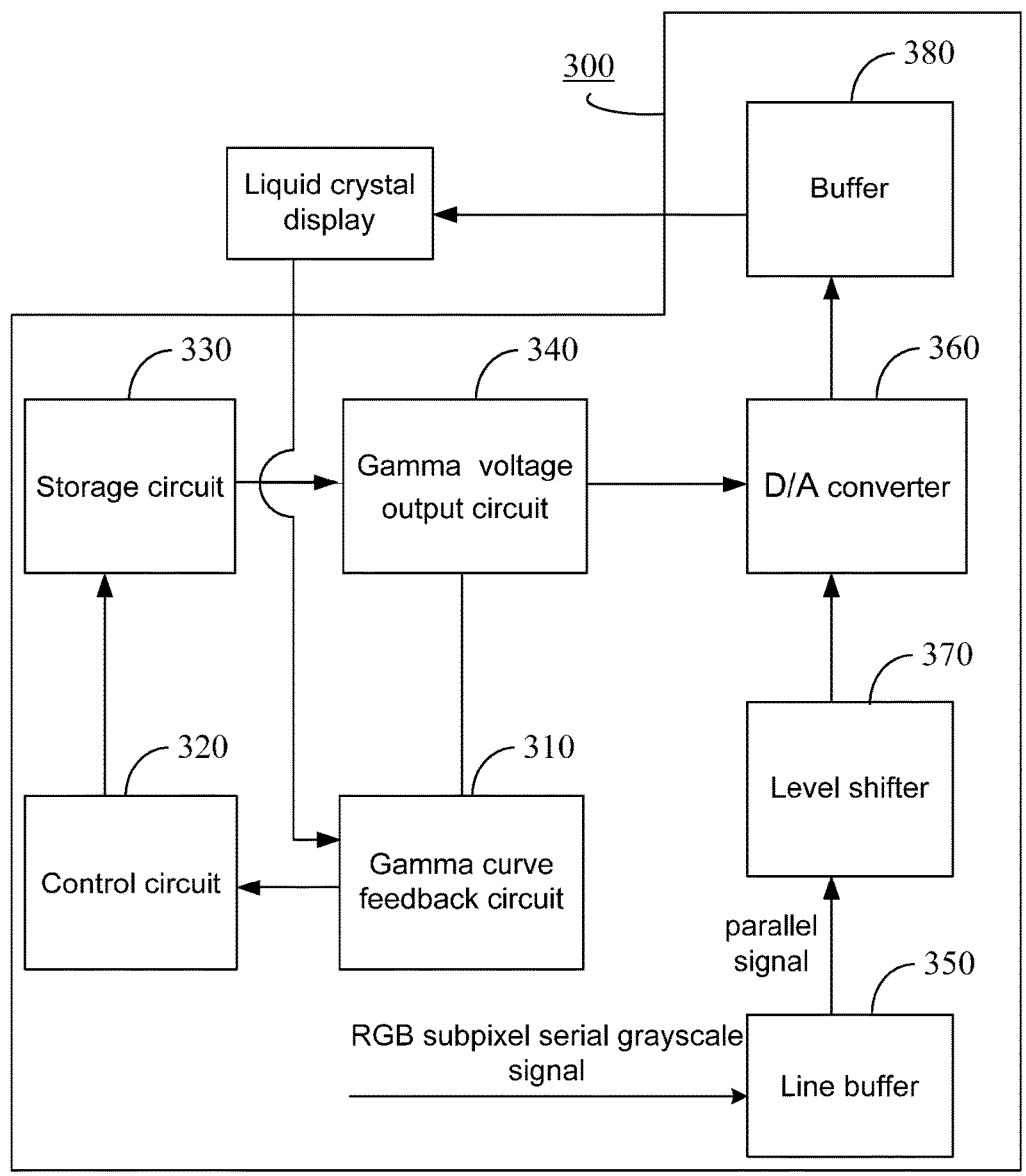
FIG. 3 is a circuit framework diagram of a Gamma voltage adjustment circuit of another preferred embodiment of the disclosure.

Referring to FIG. 1, FIG. 2 and FIG. 3, FIG. 1 is a circuit framework diagram of a liquid crystal display driving circuit of a preferred embodiment of the disclosure; FIG. 2 is a circuit framework diagram of a Gamma voltage adjustment circuit of a preferred embodiment of the disclosure; FIG. 3 is a circuit framework diagram of a Gamma voltage adjustment circuit of another preferred embodiment of the disclosure. The liquid crystal display driving circuit 10 includes a content adaptive brightness control (CABC) circuit 100 and a Gamma voltage adjustment circuit 300. The content adaptive brightness control circuit 100 is applied to adjust brightness of a backlight module in a liquid crystal display, when the content adaptive brightness control circuit 100 is turned on, the brightness of the backlight module is switched from first backlight brightness to second backlight brightness under the control of the content adaptive brightness control circuit 100, where the first backlight brightness is brighter than the second backlight brightness. Equally, when the content adaptive brightness control circuit 100 is turned on, the content adaptive brightness control circuit 100 reduces the brightness of the backlight module, equally, reducing energy consumption of the backlight module. When the brightness of the backlight module is the first backlight brightness, the Gamma voltage adjustment circuit 300 outputs a first Gamma voltage for adjusting grayscale brightness of the liquid crystal display to be first grayscale brightness. When the brightness of the backlight module is the second backlight brightness, the Gamma voltage adjustment circuit 300 outputs a second Gamma voltage for adjusting the grayscale brightness of the liquid crystal display to be second grayscale brightness. The second grayscale brightness is brighter than the first grayscale brightness, and brightness of an output image from the liquid crystal display when the grayscale brightness of the liquid crystal display is the second grayscale brightness and the brightness of the backlight module is the second backlight brightness is equal to brightness of an output image from the liquid crystal display when the grayscale brightness of the liquid crystal display is the first grayscale brightness and the brightness of the backlight module is the first backlight brightness.

In the embodiment, the Gamma voltage adjustment circuit 300 includes a Gamma curve feedback circuit 310, a control circuit 320, a storage circuit 330 and a Gamma voltage output circuit 340. The Gamma curve feedback circuit 310 is applied to detect the grayscale brightness of the liquid crystal display when the brightness of the backlight module varies, when the brightness of the backlight module is switched from the first backlight brightness to the second backlight brightness, the Gamma curve terminal circuit 310 detects the grayscale brightness of the liquid crystal display to be the second grayscale brightness and transports the second grayscale brightness to the control circuit 320. The control circuit 320 obtains the second Gamma voltage corresponding to the second grayscale brightness from the storage circuit 330 according to the second grayscale brightness, and exports the second Gamma voltage by the Gamma voltage output circuit 340.

Each grayscale brightness and Gamma voltages corresponding to each grayscale are pre-stored in the storage circuit 330, each grayscale and Gamma voltages corresponding to each grayscale can be stored in the storage circuit in a form of table or others. To various Gamma voltages stored in the storage circuit 330, grayscale brightness corresponding to each of the Gamma voltages and brightness of an image generated by backlight brightness of a backlight module corresponding to the grayscale are constant.

In the embodiment, the Gamma voltage adjustment circuit 300 further includes a line buffer 350 and a D/A converter 360. The line buffer 350 is applied to receive a RGB subpixel serial grayscale signal, and transform the RGB subpixel serial grayscale signal to a RGB subpixel parallel grayscale signal, where the RGB subpixel serial grayscale signal is a serial signal, the RGB subpixel parallel grayscale signal is a parallel signal. The D/A converter 360 is applied to convert an analog Gamma voltage generated by the Gamma voltage output circuit to a digital Gamma voltage according to the RGB subpixel parallel grayscale signal, and export the digital Gamma signal to a corresponding pixel electrode in the liquid crystal display.

In the embodiment, the Gamma voltage adjustment circuit 300 further includes a level shifter 370. The level shifter 370 is applied to receive the RGB subpixel parallel grayscale signal, and export the RGB subpixel parallel grayscale signal after its voltage being boosted to the D/A converter 360. The RGB subpixel parallel grayscale signal after its voltage being boosted assists the D/A converter 360 to select one of the analog Gamma voltage signals generated in the Gamma voltage output circuit 340 accurately according to the RGB subpixel parallel grayscale signal.

In the embodiment, the Gamma voltage adjustment circuit 300 further includes a buffer 380. The buffer 380 is applied to export the digital Gamma signal after being buffered for predetermined time to a corresponding pixel electrode in the liquid crystal display.

In the embodiment, when the content adaptive brightness control circuit 100 is turned off, the brightness of the backlight module in the liquid crystal display is constant, therefore, when the content adaptive brightness control circuit is turned off, the Gamma voltage adjustment circuit 300 is not operational, equally, the Gamma voltage exported from the Gamma voltage adjustment circuit 300 is constant.

Compared with a conventional technique, when the content adaptive brightness control circuit 100 in the liquid crystal display driving circuit 10 of the disclosure is turned on, the brightness of the backlight module is reduced from first backlight brightness to second backlight brightness. The Gamma voltage adjustment circuit 300 is adjusting the exported Gamma voltage, when the brightness of the backlight module is the first backlight brightness, the Gamma voltage adjustment circuit 300 outputs a first Gamma voltage for adjusting grayscale brightness of the liquid crystal display to be first grayscale brightness. When the brightness of the backlight module is the second backlight brightness, the Gamma voltage adjustment circuit 300 outputs a second Gamma voltage for adjusting the grayscale brightness of the liquid crystal display to be second grayscale brightness. The second grayscale brightness is brighter than the first grayscale brightness, and brightness of an output image from the liquid crystal display when the grayscale brightness of the liquid crystal display is the second grayscale brightness and the brightness of the backlight module is the second backlight brightness is equal to brightness of an output image from the liquid crystal display when the grayscale brightness of the liquid crystal display is the first grayscale brightness and the brightness of the backlight module is the first backlight brightness. The brightness of the exported image from the liquid crystal display device is constant when energy consumption of the backlight module is reduced, display performance of the image is excellent.

Figure 4:
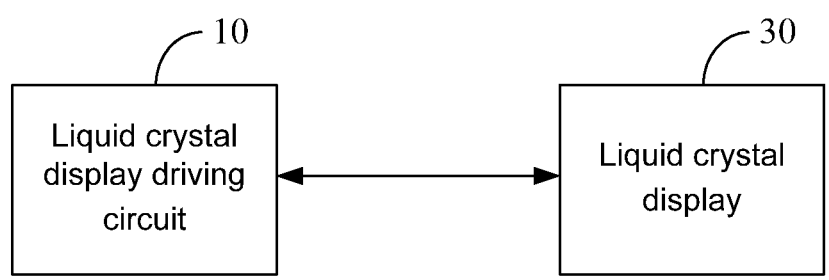
FIG. 4 is a circuit framework diagram of a liquid crystal display device of a preferred embodiment of the disclosure.

The disclosure further provides a liquid crystal display device, referring to FIG. 4 as well, FIG. 4 is a circuit framework diagram of a liquid crystal display device of a preferred embodiment of the disclosure. The liquid crystal display device 1 includes a liquid crystal display 30 and a liquid crystal display driving circuit 10. The liquid crystal display driving circuit 10 can be referred to the previous description without repeat. In the embodiment, the liquid crystal display device 1 includes a portable device such as a smart phone, a mobile internet device (MID), an E-book, a play station portable (PSP) or a personal digital assistant (PDA).

Above are embodiments of the disclosure, which do not limit the scope of the disclosure, any modifications, equivalent replacements or improvements within the spirit and principles of the embodiments described above should be covered by the protected scope of the disclosure.

What is claimed is:

1. A liquid crystal display driving circuit, wherein the liquid crystal display driving circuit comprises a content adaptive brightness control circuit and a Gamma voltage adjustment circuit, the content adaptive brightness control circuit is applied to adjust a brightness of a backlight module in a liquid crystal display, when the content adaptive brightness control circuit is turned on, the brightness of the backlight module is switched from a first backlight brightness to a second backlight brightness under control of the content adaptive brightness control circuit, where the first backlight brightness is brighter than the second backlight brightness, when the brightness of the backlight module is the first backlight brightness, the Gamma voltage adjustment circuit outputs a first Gamma voltage for adjusting a grayscale brightness of the liquid crystal display to be a first grayscale brightness, when the brightness of the backlight module is the second backlight brightness, the Gamma voltage adjustment circuit outputs a second Gamma voltage for adjusting the grayscale brightness of the liquid crystal display to be a second grayscale brightness, where the second grayscale brightness is brighter than the first grayscale brightness, and a brightness of an output image from the liquid crystal display when the grayscale brightness of the liquid crystal display is the second grayscale brightness and the brightness of the backlight module is the second backlight brightness is equal to the brightness of the output image from the liquid crystal display when the grayscale brightness of the liquid crystal display is the first grayscale brightness and the brightness of the backlight module is the first backlight brightness, wherein, the Gamma voltage adjustment circuit comprises a Gamma curve feedback circuit, a control circuit, a storage circuit and a Gamma voltage output circuit, the control circuit is electrically connected between the storage circuit and the Gamma voltage feedback circuit, the Gamma curve feedback circuit is applied to detect the grayscale brightness of the liquid crystal display to be the second grayscale brightness when the brightness of the backlight module is switched from the first backlight brightness to the second backlight brightness, and transport the second grayscale brightness to the control circuit, the control circuit obtains the second Gamma voltage corresponding to the second grayscale brightness from the storage circuit according to the second grayscale brightness, and exports the second Gamma voltage by the Gamma voltage output circuit.

2. The liquid crystal display driving circuit according to claim 1, wherein when the content adaptive brightness control circuit is turned off, the brightness of the backlight module in the liquid crystal display is constant, when the content adaptive brightness control circuit is turned off, the Gamma voltage adjustment circuit is not operational so that the grayscale brightness of the liquid crystal display is the first grayscale brightness.

3. The liquid crystal display driving circuit according to claim 1, wherein the Gamma voltage adjustment circuit further comprises a line buffer and a D/A converter, the line buffer is applied to receive a RGB subpixel serial grayscale signal, and transform the RGB subpixel serial grayscale signal to a RGB subpixel parallel grayscale signal, where the RGB subpixel serial grayscale signal is a serial signal, the RGB subpixel parallel grayscale signal is a parallel signal, the D/A converter is applied to convert an analog Gamma voltage generated by the Gamma voltage output circuit to a digital Gamma voltage according to the RGB subpixel parallel grayscale signal, and export the digital Gamma signal to a corresponding pixel electrode in the liquid crystal display.

4. The liquid crystal display driving circuit according to claim 3, wherein the Gamma voltage adjustment circuit further comprises a level shifter, the level shifter is applied to receive the RGB subpixel parallel grayscale signal, and export the RGB subpixel parallel grayscale signal after its voltage being boosted to the D/A converter.

5. A liquid crystal display device, wherein the liquid crystal display device comprises a liquid crystal display and a liquid crystal display driving circuit, the liquid crystal display driving circuit comprises a content adaptive brightness control circuit and a Gamma voltage adjustment circuit, the content adaptive brightness control circuit is applied to adjust a brightness of a backlight module in a liquid crystal display, when the content adaptive brightness control circuit is turned on, the brightness of the backlight module is switched from a first backlight brightness to a second backlight brightness under control of the content adaptive brightness control circuit, where the first backlight brightness is brighter than the second backlight brightness, when the brightness of the backlight module is the first backlight brightness, the Gamma voltage adjustment circuit outputs a first Gamma voltage for adjusting a grayscale brightness of the liquid crystal display to be a first grayscale brightness, when the brightness of the backlight module is the second backlight brightness, the Gamma voltage adjustment circuit outputs a second Gamma voltage for adjusting the grayscale brightness of the liquid crystal display to be a second grayscale brightness, where the second grayscale brightness is brighter than the first grayscale brightness, and a brightness of an output image from the liquid crystal display when the grayscale brightness of the liquid crystal display is the second grayscale brightness and the brightness of the backlight module is the second backlight brightness is equal to the brightness of the output image from the liquid crystal display when the grayscale brightness of the liquid crystal display is the first grayscale brightness and the brightness of the backlight module is the first backlight brightness, wherein, the Gamma voltage adjustment circuit comprises a Gamma curve feedback circuit, a control circuit, a storage circuit and a Gamma voltage output circuit, the control circuit is electrically connected between the storage circuit and the Gamma voltage feedback circuit, the Gamma curve feedback circuit is applied to detect the grayscale brightness of the liquid crystal display to be the second grayscale brightness when the brightness of the backlight module is switched from the first backlight brightness to the second backlight brightness, and transport the second grayscale brightness to the control circuit, the control circuit obtains the second Gamma voltage corresponding to the second grayscale brightness from the storage circuit according to the second grayscale brightness, and exports the second Gamma voltage by the Gamma voltage output circuit.

6. The liquid crystal display device according to claim 5, wherein when the content adaptive brightness control circuit is turned off, the brightness of the backlight module in the liquid crystal display is constant, when the content adaptive brightness control circuit is turned off, the Gamma voltage adjustment circuit is not operational so that the grayscale brightness of the liquid crystal display is the first grayscale brightness.

7. The liquid crystal display device according to claim 5, wherein the Gamma voltage adjustment circuit further comprises a line buffer and a D/A converter, the line buffer is applied to receive a RGB subpixel serial grayscale signal, and transform the RGB subpixel serial grayscale signal to a RGB subpixel parallel grayscale signal, where the RGB subpixel serial grayscale signal is a serial signal, the RGB subpixel parallel grayscale signal is a parallel signal, the D/A converter is applied to convert an analog Gamma voltage generated by the Gamma voltage output circuit to a digital Gamma voltage according to the RGB subpixel parallel grayscale signal, and export the digital Gamma signal to a corresponding pixel electrode in the liquid crystal display.

8. The liquid crystal display device according to claim 7, wherein the Gamma voltage adjustment circuit further comprises a level shifter, the level shifter is applied to receive the RGB subpixel parallel grayscale signal, and export the RGB subpixel parallel grayscale signal after its voltage being boosted to the D/A converter.

* * * * *